(12) United States Patent
Pucciani

(10) Patent No.: US 8,382,013 B2
(45) Date of Patent: Feb. 26, 2013

(54) AIR KNIFE

(75) Inventor: Allen S. Pucciani, Beavercreek, OH (US)

(73) Assignee: Illinois Tool Works Inc., Glenview, IL (US)

( * ) Notice: Subject to any disclaimer, the term of this patent is extended or adjusted under 35 U.S.C. 154(b) by 334 days.

(21) Appl. No.: 12/789,411

(22) Filed: May 27, 2010

(65) Prior Publication Data

US 2011/0024528 A1    Feb. 3, 2011

Related U.S. Application Data

(60) Provisional application No. 61/230,101, filed on Jul. 30, 2009.

(51) Int. Cl.
*B05B 1/04* (2006.01)
*B05B 1/02* (2006.01)
*B05B 1/00* (2006.01)

(52) U.S. Cl. .................. 239/597; 239/592; 239/600

(58) Field of Classification Search .................. 239/451, 239/455, 589, 592–595, 597, 600, 601, DIG. 13, 239/DIG. 22; 34/60, 236, 428, 443; 118/63; 454/188

See application file for complete search history.

(56) References Cited

U.S. PATENT DOCUMENTS

| | | | | |
|---|---|---|---|---|
| 3,272,176 A | * | 9/1966 | Saydlowski | 118/63 |
| 4,515,313 A | * | 5/1985 | Cavanagh | 239/455 |
| 5,064,118 A | * | 11/1991 | Lauricella | 239/1 |

* cited by examiner

*Primary Examiner* — Darren W Gorman
(74) *Attorney, Agent, or Firm* — Fletcher Yoder P.C.

(57) ABSTRACT

An air knife system includes a first set of openings and a second set of openings arranged along opposite first and second walls, respectively, of a main body. The first set of openings may be aligned with the second set of openings such that a coupling member may be inserted through each one of the first set of openings and a corresponding one of the second set of openings. The coupling members may be fixedly joined to the first and second sets of openings to maintain a desired width of a discharge slot defined by a first lip extending from the first wall and a second lip extending from the second wall. In one embodiment, the coupling members may be joined to the first and second sets of openings using a welding process.

20 Claims, 5 Drawing Sheets

AIR KNIFE

CROSS REFERENCE TO RELATED APPLICATIONS

This application is a Non-Provisional Patent Application of U.S. Provisional Patent Application No. 61/230,101, entitled "AIR KNIFE", filed Jul. 30, 2009, which is herein incorporated by reference in its entirety.

BACKGROUND

The present disclosure relates generally to fluid discharge devices and, more particularly, to fluid discharge devices configured to deliver a sheet, curtain, or "blade" of air. Such a device is sometimes referred to as an "air knife."

A variety of systems transfer fluids from a fluid supply source to one or more fluid discharge devices. In some systems, an arrangement of fluid conduits, which may include metal pipes, plastic pipes, and/or hoses, may provide a flow path for routing, channeling, or otherwise delivering a fluid from a fluid supply source to a fluid discharge device, such as an air knife. In the case of an air knife, air received via an inlet may be pressurized and directed through a slot-shaped outlet as a sheet or "blade" of air. The output of the air knife may be utilized for a variety of applications, such as drying and removing moisture from objects, removing dust or debris, cooling, and so forth.

BRIEF DESCRIPTION

Certain aspects of embodiments disclosed herein by way of example are summarized below. It should be understood that these aspects are presented merely to provide the reader with a brief summary of certain forms an invention disclosed and/or claimed herein might take, and that these aspects are not intended to limit the scope of any invention disclosed and/or claimed herein. Indeed, any invention disclosed and/or claimed herein may encompass a variety of aspects that may not be set forth below.

Embodiments of an air knife system that include a first set of openings and a second set of openings arranged along opposite first and second walls, respectively, of a main body. The first set of openings may be aligned with the second set of openings such that a coupling member may be inserted through each one of the first set of openings and a corresponding one of the second set of openings. The coupling members may be fixedly joined to the first and second sets of openings to maintain a desired width of a discharge slot defined by a first lip extending from the first wall and a second lip extending from the second wall. In one embodiment, the coupling members may be joined to the first and second sets of openings using a welding process.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As discussed in further detail below, an air knife system, in accordance with disclosed embodiments, may include a first set of openings and a second set of openings arranged along opposite first and second walls, respectively, of a main body or housing. Each of the first set of openings may be aligned with a respective one of the second set of openings, such that a coupling member may be inserted through each one of the first set of openings and a corresponding one of the second set of openings. The coupling members may be fixedly joined to the first and second sets of openings to maintain a desired width of a discharge slot defined by a first lip extending from the first wall and a second lip extending from the second wall. In one embodiment, the coupling members may be joined to the first and second sets of openings using a welding process, such as tungsten inert gas (TIG) welding.

Figure 1:
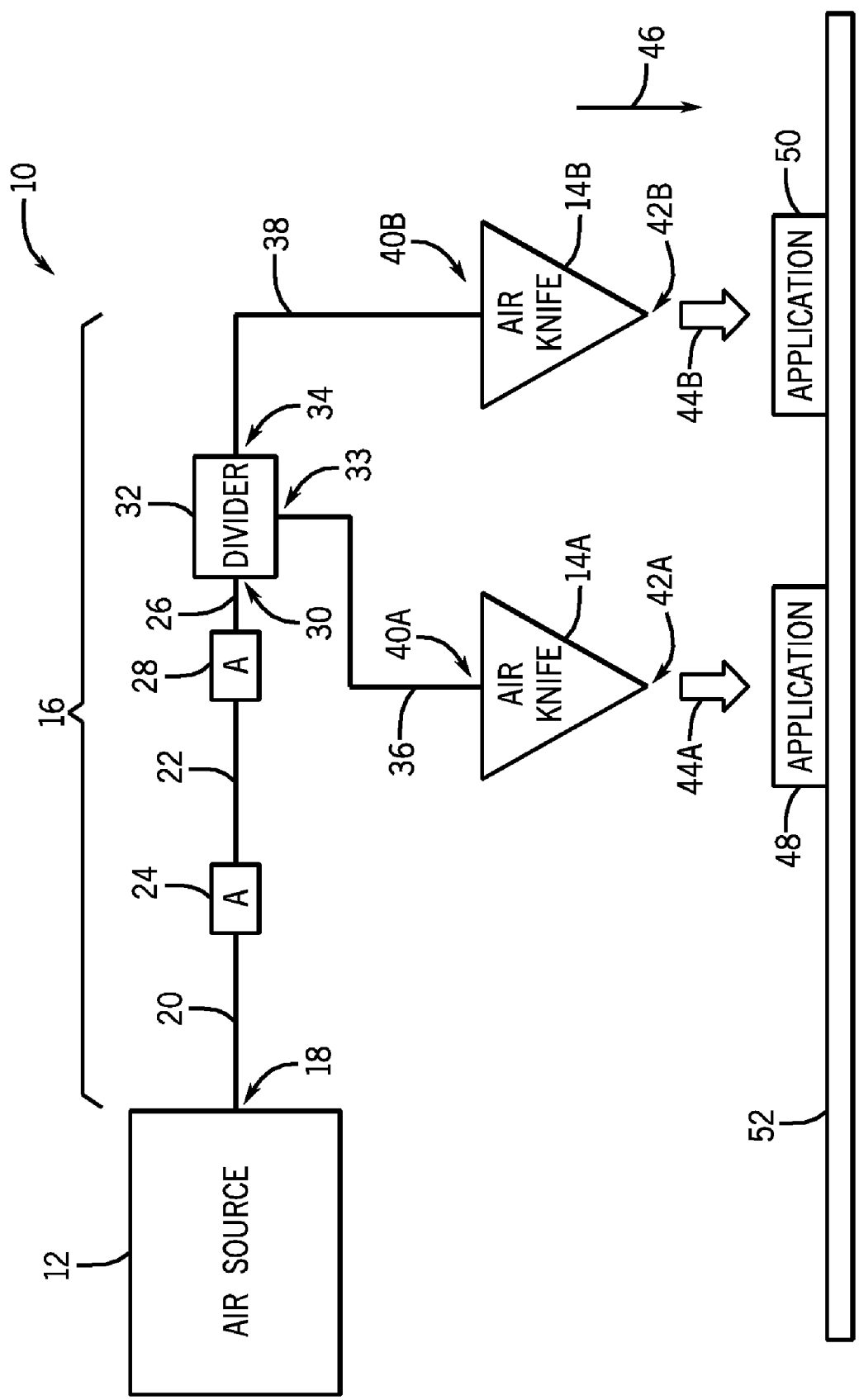
FIG. 1 is a simplified block diagram depicting a fluid-based system having one or more air knives, in accordance with embodiments of the present disclosure.

Turning now to the drawings, FIG. 1 illustrates a processing system 10 that may incorporate one or more aspects of the presently disclosed techniques. The processing system 10 includes an air supply source 12 that may deliver a fluid (e.g., air) to air knives 14A and 14B along a flow path 16. In the illustrated embodiment, the flow path 16 includes the fluid conduits 20, 22, 26, 36, and 38, the adapters 24 and 28, and the divider 32.

In the presently illustrated system 10, the air supply source 12 may include a high flow centrifugal blower ("air blower") which, in some embodiments, may include a supercharger and motor configuration. In one embodiment, the operating characteristics of the air blower 12 may provide an air flow having a pressure of between approximately 1-10 pounds per square inch (psi) and having a flow rate of between approximately 50-2000 cubic feet per minute (CFM) or more specifically, between approximately 150 to 1500 CFM. In some embodiments, the air blower 12 may be housed within an enclosure. The air blower 12 may be separated from the air knives 14A and 14B by a distance of 10, 20, 30, 40, 50, 100, or 200 feet or more. As such, the flow path 16 is configured to provide a path through which air provided by the air blower 12 may be routed and ultimately delivered to the air knives 14A and 14B.

The air blower 12 may include an outlet 18 coupled to the fluid conduit 20 that defines a first portion of the flow path 16. The fluid conduit 20 may be coupled to the downstream fluid conduit 22 by way of a first adapter 24. By way of example only, the fluid conduit 20 may be a hose, such as a flexible hose, and the fluid conduit 22 may be a pipe, such as a stainless steel pipe or a polyvinyl chloride (PVC) pipe. The adapter 24 may be configured to provide an interface for coupling the hose 20 and pipe 22. For instance, the adapter 24 may include a first adapter end configured to couple to the hose 18, and a second adapter end configured to couple to the pipe 20. In this manner, the hose 20, adapter 24, and pipe 22 are fluidly coupled, thereby allowing air discharged from the outlet 18 of the blower 12 to flow from the hose 20 into the pipe 22.

The flow path 16 continues to the distal end of the pipe 22, which may be coupled to another hose 26 by way of a second adapter 28 that may be similar in design to the first adapter 24. Thus, by way of the adapters 24 and 28, the air flow from the blower 12 may be received by an inlet 30 of a manifold or flow divider 32. The flow divider 32 may be configured to distribute or split the air flow to multiple outlets 33 and 34. Additional fluid conduits 36 and 38 may respectively couple the outlets 33 and 34 to the air knives 14A and 14B, respectively. In the illustrated embodiment, the air knives 14A and 14B may each include an inlet (40A and 40B) configured for a hose connection, and the fluid conduits 36 and 38 may thus be provided as hoses, such as flexible hoses. In other embodiments, a pipe may be disposed between the flow divider 32 and one of the air knives 14A or 14B, whereby adapters similar to the above-discussed adapters 24 or 28 are coupled to each end of the pipe to facilitate a fluid connection between hoses extending from an outlet (e.g., 33 or 34) of the divider 32 and from an inlet (e.g., 40A or 40B) of one of the air knives (e.g., 14A or 14B). A hose connection to an inlet of an air knife will be illustrated in more detail below with respect to FIGS. 2 and 3. In some embodiments, the system 10 may include only a single air knife (e.g., 14A) and thus may not include a flow divider 32. In such embodiments, the fluid conduit 26 may be coupled directly to the air knife 14A.

As will be discussed further below, the air knife 14A may include a main body having first and second end caps that define a plenum or fluid cavity for receiving an air flow via the inlet 40A. In certain embodiments, the air knife 14A may be formed of materials including aluminum, stainless steel, or some combination thereof. As shown, the main body may include a narrow discharge outlet 42A, which may include a single continuous slot or, in other embodiments, a series of narrow holes or openings. In some embodiments, the main body may be generally cylindrical in shape with one end along the cylindrical body tapering to form the discharge outlet 42A. In embodiments utilizing such a design, the main body of the air knife 14A may generally take the form of a tear drop or airfoil shape. In other embodiments, the main body may include first and second opposite walls which converge to form the discharge outlet 42A.

In operation, the fluid cavity may pressurize and discharge air received via the inlet 40A through the outlet 42A. As discussed above, in one embodiment, the outlet 42A may be a continuous discharge slot. In such embodiments, the discharge slot may have a width of between approximately 0.025 to 0.25 inches or, more specifically, between approximately 0.05 to 0.1 inches. Further, the discharge slot may have an area that is substantially less than the area of the inlet 40A. As will be discussed further below, the width of the discharge slot may be maintained or established by inserting a coupling member, such as a dowel pin or a rod, through a first opening near the discharge slot on a first wall or lip extending from the main body and a second opening near the discharge slot on an opposite second wall or lip extending from the main body. The coupling member may be fixed in place, such as by using a welding process (e.g., tungsten inert gas (TIG) welding, metal gas arc welding (GMAW), or metal inert gas (MIG) welding, etc.). Depending on the length of the discharge slot, additional coupling members may be fixed to the first and second walls in a similar manner to maintain a desired width of the discharge slot 42A. These features will be described in more detail below with reference to FIGS. 2-6.

Accordingly, the air flow 44A (which may take the form of an air blade or curtain having a knife-like edge) exiting the outlet 42A of the air knife 14A may have a velocity that is greater relative to the velocity of the air flow entering via the inlet 40A. As can be appreciated, the air knife 14B may be constructed in a manner that is similar to the air knife 14A and, thus may operate in a similar manner. Further, while only two outlets 33 and 34 are shown on the flow divider 32 of FIG. 1, it should be appreciated that the flow divider 32 may be configured to provide any suitable number of outlets, and thus may provide flow paths to any suitable number of downstream devices, including additional air knives, additional dividers, manifolds, and so forth.

As shown in FIG. 1, the air flows 44A and 44B exiting the respective discharge slots 42A and 42B of each of the air knives 14A and 14B, may be directed towards the applications 48 and 50, respectively, of the processing system 10. For instance, the applications 48 and 50 may be transported through the system 10 along a conveyor belt 52 or some other suitable type of transport mechanism. As will be appreciated, the application represented by the system 10 may utilize the air flows 44A and 44B provided by the air knives 14A and 14B, respectively, for a variety of functions, including but not limited to drying products, removing dust or debris, coating control, cooling, leak detection, surface impregnation, corrosion prevention, and so forth. For instance, in certain embodiments, the system 10 may be a system for drying food or beverage containers, such as cans or bottles, or may be a system for removing dust and other debris from sensitive electronic products, such as printed circuit boards (PCBs) or the like. In addition, some embodiments of the system 10 may also utilize the air flows 44A and 44B may to clean and/or remove debris from the conveyer belt 52.

Figure 2:
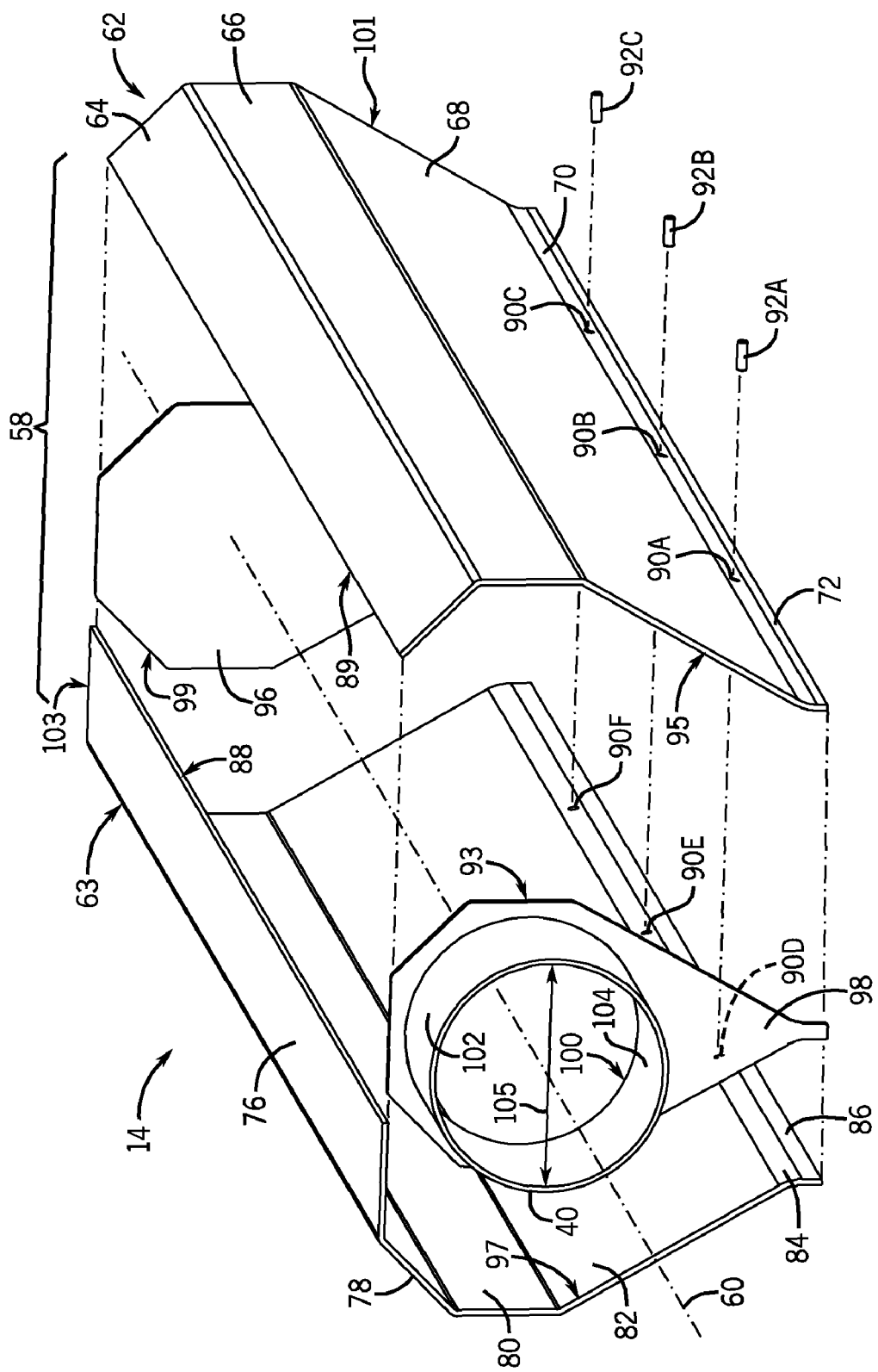
FIG. 2 is an exploded view of an embodiment of an air knife that may be utilized in the system of FIG. 1.
Figure 3:
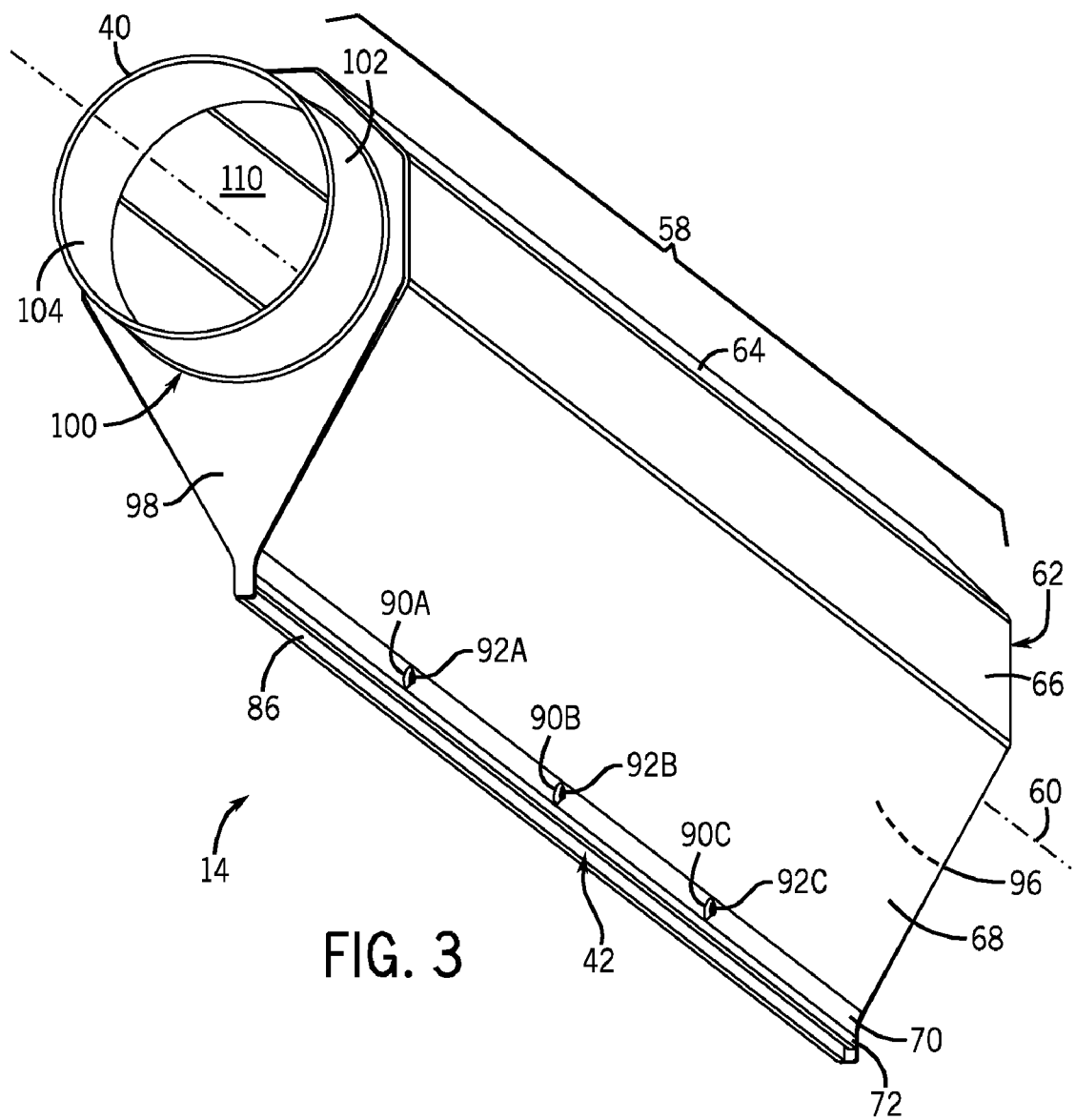
FIG. 3 is a perspective view showing the air knife embodiment depicted in FIG. 2 in an assembled state.

FIG. 2 depicts an exploded view of an embodiment of the air knife 14 which may be utilized in the system 10 of FIG. 1. The air knife 14 includes a main body or housing 58 having a longitudinal axis 60. The housing 58 may be at least partially defined by a first housing portion 62 and a second housing portion 63. In the depicted embodiment, the first housing portion 62 and the second housing portion 63 may be extruded walls or rails (e.g., having a generally constant cross-sectional shape along the longitudinal axis 60). For instance, the first housing portion 62 may be formed from a single piece or sheet of material, such as aluminum or stainless steel, which is bended or shaped using any suitable process to form an upper wall 64, a middle wall 66, and a lower wall 68, such that each of these walls are angled with respect to one another. The distal edge of the lower wall 68 may include a bended portion 70 from which a first lip 72, which may define a first side of the discharge slot 42, extends. That is, the bended portion 70 may include a slight angle or curvature, such that the first lip 72 is angled away from the housing 58. In the depicted embodiment, the lips 72 and 86 may be generally parallel with respect to one another when the air knife is assembled, as shown in FIG. 3. In other embodiments, the lips 72 and 86 may also be aligned at an angled with respect to one another.

Like the first housing portion 62, the second housing portion 63 may also be formed from a single piece or sheet of material (e.g., aluminum or stainless steel) that is bended or shaped to form a top wall 76, an upper wall 78, a middle wall 80, and a lower wall 82, such that each of these walls are angled with respect to one another. The distal edge of the lower wall 82 may include a bended portion 84 from which a second lip 86, which may define a second side of the discharge slot 42, extends. That is, the bended portion 84 may include a slight angle or curvature, such that the second lip 86 is angled away from the housing 58. Thus, when the air knife 14 is assembled, as shown in FIG. 3, the spacing or gap between the first and second lips 72 and 86 may define the discharge slot 42. In the depicted embodiment, the second housing portion 63, with the exception of the top wall 76, may be symmetrical with respect to the first housing portion 62. Further, while the housing 58 is depicted in FIG. 2 as having angled walls that are generally flat, it should be appreciated that in other embodiments, the housing 58 may not include angles and may instead include one or more curved walls, such as a cylindrical housing having one end that tapers to form the discharge slot 42.

In the depicted embodiment, the first and second housing portions 62 and 63 may be joined together using any suitable technique, such as by welding the edge 88 to the edge 89. In other embodiments, the first and second portions 62 and 63 may be fastened together using one or more screws, bolts, rivets, or any other suitable type of fasteners. Further, in some embodiments, the housing portions 62 and 63, instead of being two separate pieces, may be formed from a single piece of material (e.g., aluminum or stainless steel). The first and second housing portions 62 and 63 may include openings 90 formed along their respective bended portions 70 and 84. For instance, in FIG. 2, the first housing portion 62 may include the openings 90A, 90B, and 90C, which correspond to the openings 90D (in phantom), 90E (in phantom), and 90F, respectively, on the second housing portion 63. The openings 90A-90F may be formed by any suitable technique, as such as drilling. To form the discharge slot 42, the coupling member 92A may be inserted through the openings 90A and 90D, the coupling member 92B may be inserted through the openings 90B and 90E, and the coupling member 92C may be inserted through the openings 90C and 90F.

Once the coupling members 92A-92C are inserted through their respective openings (90A-90F), they may be welded in place to define and/or maintain a desired width of the discharge slot 42 (e.g., the spacing between the first lip 72 and the second lip 86). For instance, referring to the coupling member 92A as an example, this coupling member may be inserted through the opening 90A on the first housing portion 62 and the opening 90D on the second housing portion 63, such that a portion of the coupling member 92A extends or protrudes outwardly (e.g., away from the housing 58) from the opening 90A and from the opening 90D. A welding process (e.g., TIG welding) may then be utilized to weld the end of the coupling member 92A that extends from the opening 90A to the first housing portion 62 and to weld the end of the coupling member 92A that extends from the opening 90D to the second housing portion 63, thereby setting the spacing between the first lip 70 and the second lip 86. The coupling members 92B and 92C may be welded to the housing 58 in a similar manner. Further, while only three coupling members 92A, 92B, and 92C and three respective sets of openings (90A and 90D, 90B and 90E, 90C and 90F) are illustrated in FIG. 2, it should be appreciated that other embodiments may utilize fewer or more coupling members and openings depending, for example, upon the length of the discharge slot 42.

As will be appreciated, by utilizing welding for defining and/or maintaining the width of the discharge slot 42, the present technique may be more sanitary for food and beverage applications, as weld joints generally have fewer crevices in which bacteria may grow or cultivate. Additionally, when compared to certain conventional air knife designs which may utilize stiffening brackets that are fastened to the exterior of the housing, welding the coupling members 92A-92C requires fewer parts and, therefore, may reduce the production and manufacturing costs.

As further shown in FIG. 2, the air knife 14 may also include end caps 96 and 98 which may be joined to the first and second housing portions 62 and 63 to define a fluid cavity. For instance, in the depicted embodiment, each of the end caps 96 and 98 may have a shape that is generally identical to the cross-sectional shape of the first and second housing portions 62 and 63 when assembled (e.g., welded at the edges 88 and 89). The end cap 96 may be joined to the first housing portion 62 and the second housing portion 63 using one or more fasteners or via a welding process (e.g., TIG welding). By way of example, the edges 93 and 99 of the end caps 98 and 96 may be welded to the edges 95 and 101 of the first housing portion 62 and the edges 97 and 103 of the second housing portion 63, respectively.

The end cap 98 may include an opening 100 from which the inlet 40 extends outwardly (e.g., away from the housing 58). For instance, the inlet 40 may be an annular protrusion with an annular outer wall 102 and an annular inner wall 104. The inlet 40 has an outside diameter (OD) 105 and may be sized to accommodate any suitable fluid conduit for delivering an air flow from the blower 12 (FIG. 1). For instance, in some embodiments, the inlet 40 may be joined to a fluid conduit, such as a flexible hose, such that the outer wall 102 fits against an inner wall of the fluid conduit (e.g., conduit 36 of FIG. 1). In one embodiment, the ID 105 of the inlet 40 may be between approximately 2 to 6 inches (e.g., 2, 2.5, 3, 3.5, 4, 4.5, 5, 5.5, or 6 inches). As mentioned above, the surface area of the inlet opening 40 may be greater than the surface area of the discharge slot 42.

FIG. 3 depicts a perspective view of the embodiment of the air knife 14 shown in FIG. 2 in an assembled form. As discussed above, the first housing portion 62, the second housing portion 63, the end cap 96, and the end cap 98 may be welded together to form the housing 58, which may define a fluid cavity 110. The fluid cavity 110 may pressurize and discharge air received via the inlet 40 through the discharge slot 42. The width of the discharge slot 42 is defined by the spacing between the first lip 72 (on the first housing portion 62) and the second lip 86 (on the second housing portion 63). The spacing between the first and second lips 72 and 86 may be set by inserting the coupling members 92A-92C through their corresponding openings 90A-90F and welding the coupling members 92A-92C in place to achieve a desired spacing between the first lip 72 and the second lip 86. That is, the spacing between the first lip 72 and the second lip 86 defines the discharge slot 42 through which air within the fluid cavity 110 may be discharged (e.g., as output air flow 44 in FIG. 1).

Figure 4:
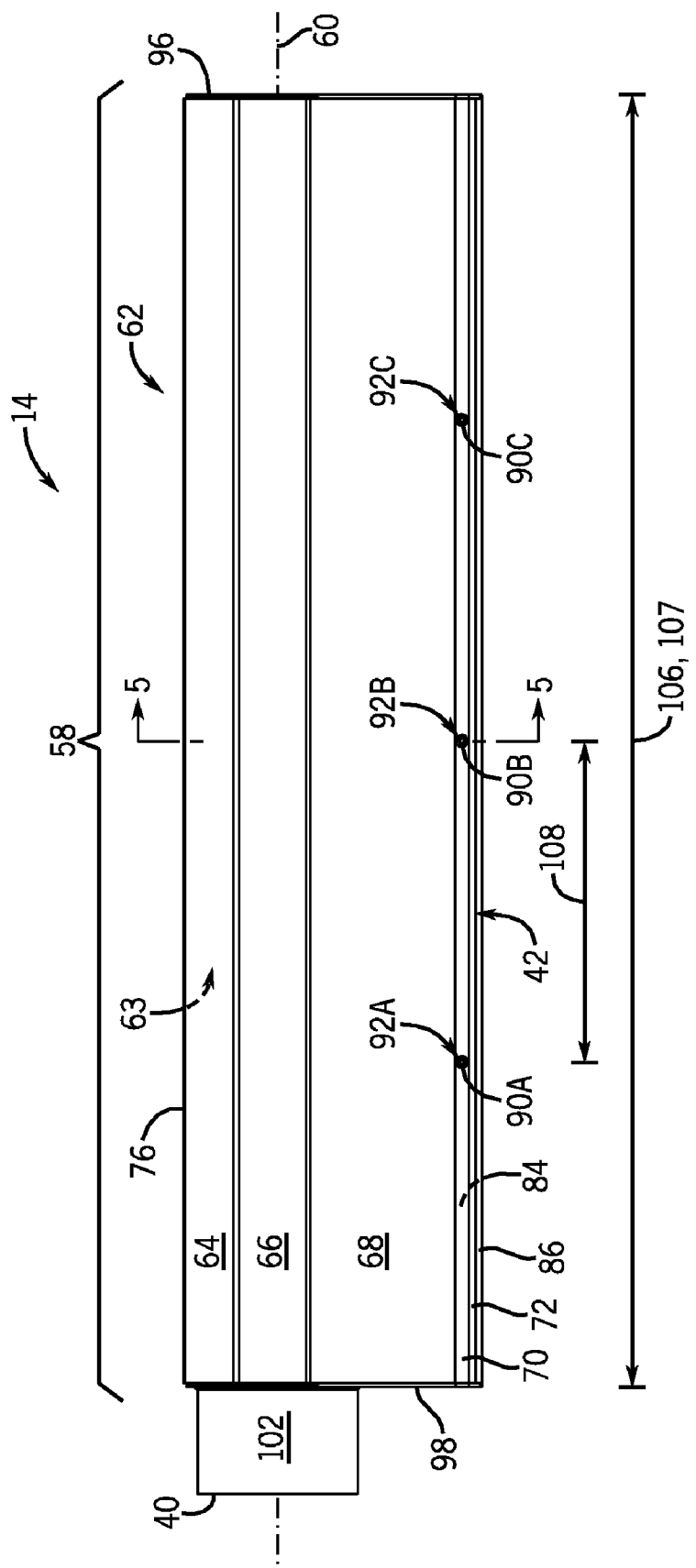
FIG. 4 is a side view of the air knife embodiment depicted in FIG. 3.

FIG. 4 shows a side view of the embodiment of the air knife 14 depicted in FIGS. 2 and 3. The housing 58 may have an axial length 106, and the discharge slot 42 may have an axial length 107. In certain embodiments, the length 106 of the main housing may be between approximately 0.5 feet to 4 feet (e.g., 0.5, 1, 1.5, 2, 2.5, 3, 3.5, or 4 feet). In other embodiments, the length 106 may also be greater than 4 feet (e.g., 5, 6, 7, or 8 feet or more). In the depicted embodiment, the lengths 106 and 107 may be equal. In some other embodiments, the length 107 of the discharge slot 42 may be less than the length 106 of the housing 58. By way of example only, in certain embodiments, the length 107 of the discharge slot 42 may be between approximately 85 to 95 percent of the length 106 of the housing 58.

While the air knife 14 embodiment shown in FIGS. 2-4 includes three coupling members 92A-92C, it should be appreciated that various embodiments may provide any suitable number of coupling members, as well as corresponding openings on the first and second housing portions 62 and 63 for each coupling member. For instance, in certain embodiments, the air knife 14 may include anywhere from between 1 to 20 coupling members or more. As shown, the coupling members 92A-92C and their respective openings 90A-90C (on the bended portion 70 of the first housing portion 62) and 90D-90F (on the bended portion 84 of the second housing portion 63) are axially spaced apart along the length 107 of the discharge slot 42, such that each coupling member 92A-92C is separated in the axial direction by a spacing distance 108. The distance 108, in some embodiments, may be between approximately The distance 108, in some embodiments may be between approximately 1 to 12 inches or, more specifically, between approximately 2 to 8 inches or, even more specifically, between approximately 3 to 6 inches. In other embodiments, the distance 108 may be determined as a percentage of the total axial length 106 of either the main body or the total axial length 107 of the discharge slot 42 (e.g., in an embodiment where the lengths 106 and 107 differ). By way of example, in an embodiment where the lengths 106 and 107 are equal, the distance 108 may be between approximately 10 to 30 percent or, more specifically, between approximately 15 to 25 percent of the length 106. In further embodiments, the spacing 108 may also be different between each coupling member 92. For instance, in one embodiment, the spacing 108 may progressively increase or decrease from a first end of the discharge slot 42 at the end cap 98 to a second end of the discharge slot 42 at the end cap 96.

Figure 5:
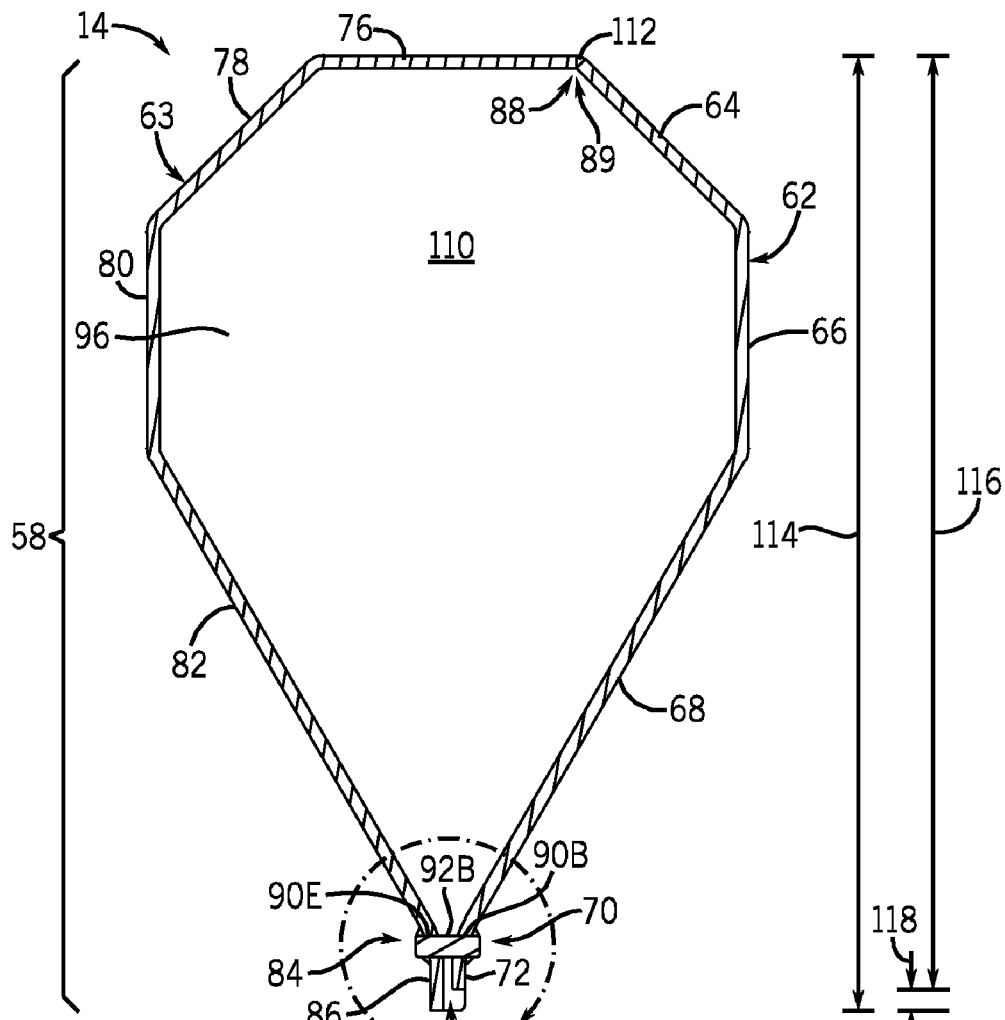
FIG. 5 is a cross-sectional view of the air knife embodiment shown in FIG. 4, taken along cut-line 5-5.

FIG. 5 depicts a cross-sectional view of the embodiment of the air knife 14 shown in FIGS. 2-4 taken through the line 5-5 in FIG. 4. Particularly, the cross-sectional view of FIG. 5 depicts the coupling member 92B inserted and welded in place between the opening 90B on the first housing portion 62 and the opening 90E on the second housing portion 63 to set the spacing between first lip 72 and the second lip 86, thereby defining the width of the discharge slot 42. As will be appreciated, the coupling members 92A and 92C (not visible in this cross-sectional view) may be welded in a similar manner. The fluid cavity 110 is defined within the housing 58, which includes the first housing portion 62, the second housing portion 63, the end cap 96, and the end cap 98 (not visible in this cross-sectional view). As discussed above, the edge 89 of the first housing portion 62 may be joined to the edge 88 of the second housing portion 63 by a welding process (e.g., TIG welding), as indicated by the weld joint 112.

The housing 58 may have an overall height 114, which may be between approximately 3 to 18 inches, or more specifically, between approximately 4 to 12 inches, or even more specifically, between approximately 5 to 9 inches. In some embodiments, the height 114 may also be greater than 18 inches. In the illustrated embodiment, the height of the lip 72 may differ from the height of the lip 86. That is, the distance (e.g., height) by which the lip 72 extends from the bended portion 70 of the lower wall 68 of the first housing portion 62 may be different from the distance by which the opposite lip 86 extends from the bended portion 84 of the second housing portion 63. Particularly, the height of the lip 72 is less than the height of the lip 86 in the illustrated embodiment, which results in the height 116 of the first housing portion 62 being less than the height 114 of the second housing portion 63 (e.g., having the same height as the overall height 114 of the housing 58) by a distance represented by reference number 118. The difference in the heights of the lips 72 and 86 will be discussed in further detail below in FIG. 6. Further, it should also be appreciated that in other embodiments, the heights of the lips 72 and 86 may be equal. In such embodiments, the heights 114 and 116 may also be equal. In further embodiments, the height of the lip 72 may be greater than the height of the lip 86, which may result in the height 116 of the first housing portion 62 being greater than the height 114 of the second housing portion 63.

Figure 6:
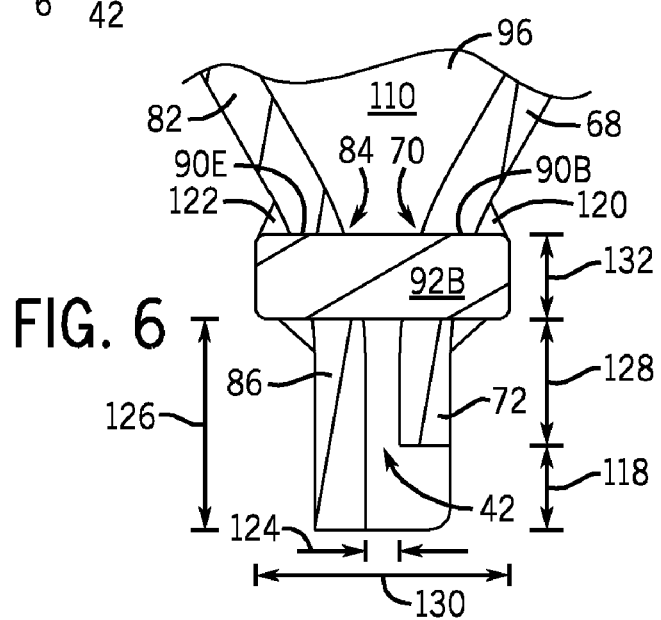
FIG. 6 is a partial cross-sectional view of a portion of the air knife embodiment depicted in FIG. 5, taken within arcuate line 6-6.

FIG. 6 depicts the region taken within line 6-6 of the cross-sectional representation shown in FIG. 5. Particularly, FIG. 6 illustrates the spacing between the first lip 72 and the second lip 86 in more detail. As shown, the coupling member 92B is inserted through the openings 90B and 90E (located at the bended portions 70 and 84, respectively) and is welded thereto, as indicated by the weld joints 120 and 122, respectively. As discussed above, the welded coupling member 92B serves to set and maintain the spacing between the first lip 72 and the second lip 86 and, thus, the width 124 of the discharge slot. In certain embodiments, the width 124 may be between approximately 0.025 to 0.25 inches or, more specifically, between approximately 0.05 to 0.1 inches.

The embodiment shown in FIG. 6 further illustrates the difference between the height 128 of the lip 72 and the height 126 of the lip 86. In certain embodiments, the height 126 of the lip 86 may be between approximately 0.2 to 1 inch or, more specifically, between approximately 0.25 to 0.4 inches. In some embodiments, the height 128 of the lip 70 may be defined as a percentage of the height 126, such as between approximately 35 to 65 percent or, more specifically, between approximately 45 to 55 percent. By way of example only, in one particular embodiment, the lip 86 may have a height 126 of approximately 0.25 inches, and the lip 72 may have a height of approximately 0.125 inches. In embodiments where the heights 126 and 128 differ, the air flow (e.g., air flow 44 in FIG. 1) exiting the discharge slot 42 may flow based on the Coanda effect (e.g., referring to the tendency of a fluid to be attracted to a surface), in which the exiting air flow 44 is attracted to the portion of the lip 86 that extends beyond the lip 72 as it leaves the discharge slot 42. As will be appreciated, this may serve to straighten the air flow 44 and to direct the air flow 44 in the intended direction 46 (e.g., toward a particular application 48 or 50).

The coupling member 92B may be generally cylindrical in shape (e.g., having a circular cross-section), such as a dowel pin or rod. Alternatively, the coupling member 92B may have a square-shaped, rectangular shaped, triangular-shaped, diamond-shaped, or oval shaped cross-section. Thus, it should be understood that the openings 90A-90F may be sized and shaped to receive their respective coupling members 92A-92C. In the depicted embodiment, the coupling member 92B may have a length 130 and a diameter 132. In certain embodiments, the length 130 may be between approximately 0.25 to 1.5 inches or, more specifically, between approximately 0.35 to 0.75 inches. The diameter 132, in certain embodiments, may be between approximately 0.1 to 0.25 inches (e.g., 0.1, 0.125, 0.15, 0.175, 0.2, 0.25 inches). Further, in certain embodiments, the length 130 of the coupling member 90B may be between approximately 3 to 8 times the width 124 of the discharge slot 42.

Further, while the openings 90B and 90E are shown as being formed on the bended portions 70 and 84, respectively, it should be appreciated that in other embodiments, the openings 90B and 90E (as well as 90A, 90C, 90D and 90F), may be located at different positions with respect to the height 114 of the main housing 58. For instance, in one embodiment, the openings 90A-90F may be located at a position that is between approximately 90 to 99 percent of the height 114 when measured from the top wall 76 of the housing 58.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising
an air knife comprising:
a main housing comprising:
a wall defining a fluid cavity, wherein the wall comprises a first opening formed on a first side of the wall and a second opening formed on a second side of the wall, wherein the first and second openings are aligned on opposite sides of the wall and facing one another;
a first lip extending from the first side of the wall;
a second lip extending from the second side of the wall, wherein the first lip and the second lip are separated by a distance to define a width of a fluid discharge slot; and
a first coupling member extending through the first and second openings, wherein the first coupling member is fixedly joined to the first and second openings to permanently maintain the width of the fluid discharge slot.

2. The system of claim 1, wherein the width of the fluid discharge slot is between approximately 0.025 to 0.25 inches.

3. The system of claim 1, wherein the first coupling member comprises a dowel pin or a rod.

4. The system of claim 1, wherein the coupling member is fixedly joined to the first and second openings using a weld joint.

5. The system of claim 1, wherein the first side of the wall comprises a first bended portion having a curvature from which the first lip extends, the second side of the wall comprises a second bended portion having a curvature from which the second lip extends, the first opening is formed on the first bended portion, and the second opening is formed on the second bended portion.

6. The system of claim 1, wherein the first lip extends from the first side of the wall by a first distance and the second lip extends from the second side of the wall by a second distance.

7. The system of claim 6, wherein the first distance is between approximately 35 to 65 percent of the second distance.

8. The system of claim 1, wherein the wall defining the fluid cavity comprises a first housing portion defining a first extruded wall and a second housing portion defining a second extruded wall, and wherein an edge of the first housing portion and the second housing portion are welded together to form the main housing.

9. The system of claim 1, wherein the wall comprises:
a third opening formed on the first side of the wall;
a fourth opening formed on the second side of the wall, wherein the third and fourth openings are aligned on opposite sides of the wall and facing one another; and
a second coupling member extending through the third and fourth opening, wherein the second coupling member is fixedly joined to the third and fourth openings to permanently maintain the width of the fluid discharge slot.

10. The system of claim 9, wherein the first and second openings are axially spaced from the third and fourth openings, respectively, by a distance that is between approximately 10 to 30 percent of the axial length of the main housing.

11. The system of claim 1, comprising a first end cap joined to a first axial end of the main housing and a second end cap joined to a second axial end of the main housing to define the fluid cavity.

12. The system of claim 11, wherein the first end cap comprises an opening configured to direct a fluid flow into the main housing.

13. A method for manufacturing an air knife, comprising:
providing a main housing body having a wall defining a fluid cavity, a first lip extending from a first side of the wall, and a second lip extending from a second side of the wall;
forming a first opening through the first side of the wall;
forming a second opening through the second side of the wall, such that the first and second openings are aligned on opposite sides of the wall and facing one another;
positioning a coupling member through the first and second openings; and
fixedly joining the coupling member to the first and second openings to permanently maintain a desired distance between the first and second lips to define a fluid discharge slot of the air knife.

14. The method of claim 13, wherein fixedly joining the coupling member to the first and second openings comprises welding the coupling member to the first and second openings.

15. The method of claim 14, wherein welding the coupling member to the first and second openings comprises using a metal inert gas welding process.

16. The system of claim 1, wherein the first and second sides of the wall are outermost sides of the main housing.

17. The system of claim 1, wherein the first and second lips have opposing inner surfaces that are generally parallel to one another along a tip portion having the fluid discharge slot.

18. The system of claim 17, wherein the first coupling member extends through the first and second openings in the tip portion.

19. A system comprising
an air knife comprising:
a main housing comprising:

a wall defining a fluid cavity, wherein the wall comprises a first opening formed on a first side of the wall and a second opening formed on a second side of the wall, wherein the first and second openings are aligned on opposite sides of the wall and facing one another;

a first lip extending from the first side of the wall;

a second lip extending from the second side of the wall, wherein the first lip and the second lip are separated by a distance to define a width of a fluid discharge slot, the first side of the wall comprises a first bended portion having a curvature from which the first lip extends, the second side of the wall comprises a second bended portion having a curvature from which the second lip extends, the first opening is formed on the first bended portion, and the second opening is formed on the second bended portion; and a first coupling member configured to be inserted through the first and second openings, wherein the first coupling member is fixedly joined to the first and second openings to maintain the width of the fluid discharge slot.

20. A system comprising
an air knife comprising:
   a main housing comprising:
      a wall defining a fluid cavity, wherein the wall comprises a first opening formed on a first side of the wall and a second opening formed on a second side of the wall, wherein the first and second openings are aligned on opposite sides of the wall and facing one another;
      a first lip extending from the first side of the wall;
      a second lip extending from the second side of the wall, wherein the first lip and the second lip are separated by a distance to define a width of a fluid discharge slot; and
      a first coupling member extending through the first and second openings, wherein the first coupling member is fixedly joined to the first and second openings to prevent adjustment and maintain the width of the fluid discharge slot.

\* \* \* \* \*